United States Patent

[11] 3,559,757

[72] Inventors Hans R. Weiss
Niles;
Joseph G. Baran, Northbrook, Ill.
[21] Appl. No. 701,332
[22] Filed Jan. 29, 1968
[45] Patented Feb. 2, 1971
[73] Assignee Taroda Industries, Inc.
Chicago, Ill.
a corporation of Illinois

[54] AUTOMOBILE THEFT PREVENTION DEVICE
5 Claims, 3 Drawing Figs.

[52] U.S. Cl. .................................................. 180/114,
307/10; 337/10
[51] Int. Cl. ................................................... B60r 25/00
[50] Field of Search .......................................... 180/114,
82; 307/10; 340/63, 64; 200/42; 337/10

[56] References Cited
UNITED STATES PATENTS
1,373,242  3/1921  Hellman .................. 340/63

| 2,215,247 | 9/1940 | Murphy | 337/10 |
|---|---|---|---|
| 2,500,182 | 3/1950 | Huertas | 337/10 |
| 2,692,309 | 10/1954 | Ellithorpe | 337/10X |
| 3,054,470 | 9/1962 | Leviness | 180/114 |
| 3,160,761 | 12/1964 | Fuller | 307/10 |
| 3,439,771 | 4/1969 | Commins | 180/114 |
| 3,453,591 | 7/1969 | Perez | 307/10 |

Primary Examiner—Kenneth H. Betts
Attorney—Darbo, Robertson & Vandenburgh

ABSTRACT: In the primary circuit, which includes the coil and distributor points of an internal combustion engine, there is inserted a delayed action fuse in parallel with a manually operable switch. The fuse is of a capacity to blow with delay under the current normally present in the primary circuit. When the switch is open, the vehicle will operate for a delayed period before the fuse blows and disables the engine. With the switch closed, the engine may be operated whether or not the fuse is blown.

PATENTED FEB 2 1971　　　　　　　　　　　　　　3,559,757

INVENTORS:
HANS R. WEISS
JOSEPH G. BARAN

By Barbo, Robertson &
Vandenburgh      Attys.

AUTOMOBILE THEFT PREVENTION DEVICE

SUMMARY OF THE INVENTION

The present invention relates to a theft prevention device which may be inserted in the primary ignition circuit of the automobile engine to permit the engine to be operated by a thief for a period of time after which the engine becomes completely disabled. While the vehicle owner, by the operation of a switch, may prevent such disabling of the vehicle or render the vehicle operable if it has been so disabled.

BACKGROUND OF THE INVENTION

Vehicle theft is an evermore pressing problem. Generally, it is a relatively simple matter for a thief to break or disable the conventionally employed locks on vehicles. As soon as this happens and the thief gets the vehicle away from the place at which it was parked, he can operate it, at least for some time, with relative impunity and he feels safe in doing so. If the vehicle does not become immediately operable the thief is likely to look for a feature on it which has rendered it incapable of operation, find that feature, inactivate it and drive the vehicle away.

The present invention has for its principal purpose the permitting of a thief to drive a car away, if he is intent on doing so, but shortly thereafter disabling the vehicle when the thief has gotten out into traffic. Under the latter condition, he dares not take time to look for hidden gimmicks because of the presence of other cars and drivers, potentially including police, in the conspicuous position in which the thief finds himself. Without knowing the secret, the thief cannot operate the car to any extent since it is permanently disabled. Some prior art devices, directed toward achieving the same general result, have the deficiency that they do not permanently disable the vehicle, but permit it to be operated intermittently. When this is possible the vehicle can be moved to a less inconspicuous spot to enable the thief to spend the time necessary to discover the hidden secret of making the car work. The operator, or other knowledgeable individuals having time to examine the vehicle (such as the police) can render it operable so as to permit it to be moved even after such a disablement. The owner can initially prevent such a disablement by the flick of an inconspicuous switch when the car is started.

One important advantage of the invention is its simplicity. It is low in initial cost. If the crucial fuse has been blown, it is quickly and inexpensively replaceable by a readily available replacement fuse. This can be done at little cost and with no necessity for substantial technical knowledge. By the same token the average car owner can add this unit to his existing automobile even though he has little knowledge of the technicalities of the electrical circuitry of the engine ignition system. Other objects and advantages will be apparent from the following description taken in conjunction with the drawings.

DETAILED DESCRIPTION

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements or combinations in which the inventive concepts are found.

Figure 1:
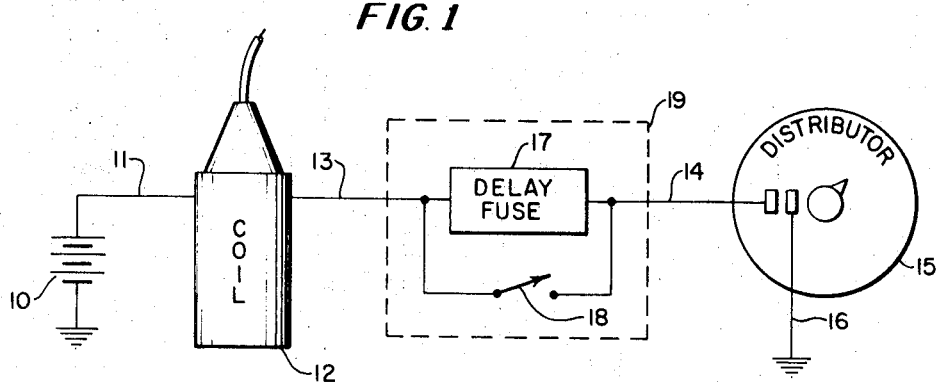
FIG. 1 is a schematic diagram of the primary electrical system of an internal combustion engine showing the use of the invention therein.

FIG. 1 illustrates the primary electrical system of an internal combustion engine. It includes a battery 10, serving as a source of power. One side of the battery is grounded and the other side is connected by a wire 11 to the primary of a high voltage ignition coil 12. By wires 13 and 14 the other end of the primary of coil 12 is connected to one of the points of distributor 15. The other point of the distributor is connected to ground by a wire 16 so that through the ground connection there is an electrical circuit back to battery 10.

Normally wires 13 and 14 comprise a single wire, but in accordance with the present invention they are separated by a delayed action fuse 17 in parallel with a manually operable switch 18. Fuse 17 is of a capacity such that it will blow, i.e. provide an open circuit, with the normal current present in this primary circuit. This blowing takes place after a delay determined by the characteristics of the fuse. The delay should be sufficient to permit the operation of the vehicle for a period of time such as to allow the vehicle to be driven some short distance away from where it was parked, but to thereafter blow and disable the vehicle.

Switch 18 is located in some inconspicuous position in the vehicle. When the vehicle is parked, the operator opens switch 18. If the vehicle is thereafter driven, it can be moved out into the street traffic where it will be very conspicuous to passing drivers when the fuse blows and disables the vehicle. In such a conspicuous position, the thief dare not stay with the vehicle for a period of time sufficient to find switch 18 (even if he knows what to look for). There is always the imminent possibility of a police car coming by and stopping because of the position of the car obstructing traffic. In contrast, when the owner attempts to restart the vehicle, he closes switch 18 as well as unlocking the vehicle in the usual manner. So long as switch 18 is closed it prevents the blowing of fuse 17 and permits the car to be operated in the usual manner without fear of disablement.

Figure 2:
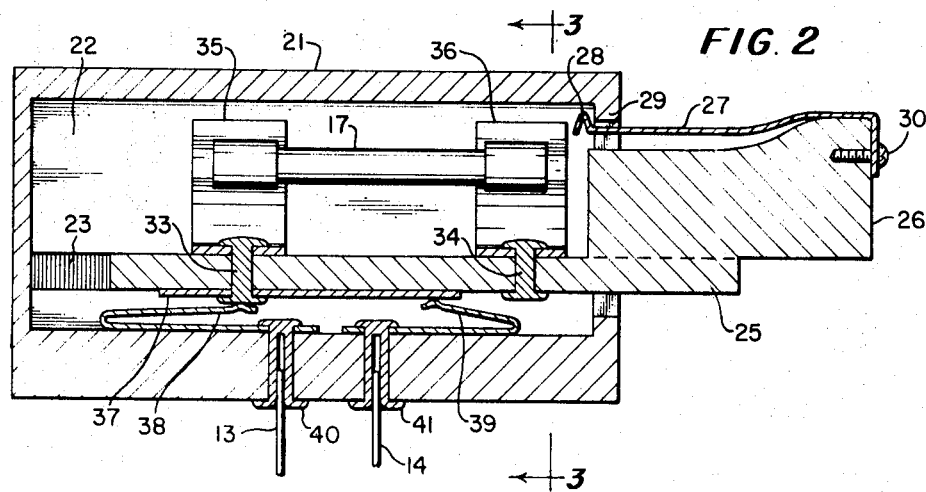
FIG. 2 is a section longitudinally through an embodiment of the invention.
Figure 3:
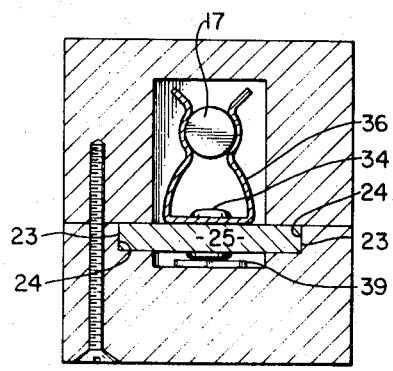
FIG. 3 is a transverse section as seen on 3—3 of FIG. 2.

While switch 18 and fuse 17 need not be a single package, as suggested by dotted lines 19, it is particularly convenient to vend them in a package form so as to simplify the installation by the car owner in his existing vehicle. In this way only two connections, wires 13 and 14, need be made to the existing equipment. FIGS. 2 and 3 illustrate a specific embodiment of such a package. This includes a case 21 having a hollow interior 22. The case is provided with suitable mounting means (not shown) to permit it to be readily mounted in an inconspicuous, but convenient, position in the automobile.

At each side of the hollow interior of the case, it defines ways 23. In these ways are received the sides 24 of a traveler 25. The traveler includes a handle 26 by which it may be moved back and forth in the ways between the position illustrated in FIG. 2 and a position at which, instead of the switch being closed, the switch is open and fuse 17 is connected between wires 13 and 14. A spring arm 27 has an end 28 which hooks under lip 29 at the top of the case. This functions as a releasable latch to normally hold the traveler in the case, as illustrated in FIG. 2. By depressing spring arm 27 with a finger, the latch will be released so that the traveler can be removed from the case for the replacement of fuse 17. Arm 27 is affixed to handle 26 by means of a screw 30.

Affixed to traveler 25 by means of a pair of rivets 33 and 34 are a pair of fuse holders 35 and 36. Rivet 33 also holds an electrically conductive strap 37 which serves as the movable member of switch 18. A pair of spring fingers 38 and 39 are attached to case 21 by rivets 40 and 41 respectively. Wires 13 and 14 are connected to rivets 40 and 41 to make an electrical circuit to fingers 38 and 39.

With the traveler 25 in the position illustrated in FIG. 2, the switch 18 is closed since there is an electrical circuit from wire 13, rivet 40, finger 38, rivet 33, strap 37, finger 39, and rivet 41 to wire 14. When the vehicle is parked, the operator grasps handle 26 and moves the traveler all of the way into the case (to the left in FIG. 2). In this latter position finger 38 bears against strap 37 so as to continue to form an electrical connection with rivet 33. However, finger 39 no longer contacts strap 37 so that switch 18 is open. But, finger 39 now does contact rivet 34 so that the fuse 17 is connected in series with the wires 13 and 14. The electrical circuitry is now that illustrated in FIG. 1 so that if an effort is made to operate the vehicle, it can be operated for a brief period of time after which fuse 17 will blow and disable the vehicle.

We have found that in the usual automobile the current through the primary circuit of FIG. 1 is approximately 2 amperes at normal (not high speed) operation. This will vary somewhat with existing conditions of operation, including speed. However, with this situation we use a fuse 17 rated to carry a maximum of approximately 1.5 amperes. We prefer to use a fuse which will blow with a delay of about 35 to 45 seconds after the overload is imposed thereon. This permits the vehicle to be operated a short distance, apparently functioning properly, after which it suddenly becomes disabled. The exact delayed time is subject to variation depending upon the desires of the manufacturer or user. Fuses suitable for this purpose are commercially available and identified by the number 3 AG, the Buss fuse of this type is identified as a Fusetron and the Littlefuse brand is identified as Sloblo.

I claim:

1. A theft protective device for use with a vehicle having an internal combustion engine with a source of electrical power, an ignition coil, a distributor and means forming a primary circuit from the battery through the coil and the distributor which circuit carries current of approximately a given amperage under normal vehicle operation, said device being adapted to be inserted in said means to form a part thereof and including: a delayed operating fuse and a switch in parallel with each other, said fuse being of a capacity to blow after approximately a given period of delay when said amperage is flowing therethrough to produce an open circuit therethrough, whereby with said switch open said vehicle may be started and run for approximately the delay period before the fuse will blow and thereby render the engine incapable of continued operation and with said switch closed the vehicle may be operated if the fuse is blown and the circuit through the switch will prevent the blowing of the fuse when the fuse has not blown.

2. A device as set forth in claim 1, wherein said fuse is rated at about 1.5 amperes.

3. A device as set forth in claim 1, including a case adapted to be mounted at an inconspicuous position in said vehicle, said case having a hollow interior, a traveler mounted in said interior and removable therefrom, said traveler being movable between two positions in said case, a pair of fuse holders for said fuse mounted on the traveler and having electrical connections thereto at one side of the traveler, a bridging strap on a side of the traveler, and a pair of spaced connections at the interior of the case to which said means may be attached, the positioning of said connections and strap being such that in one of said traveler positions the two fuse holder connections are electrically connected to the pair of case connections respectively and in the other traveler position the strap electrically connects the pair of case connections to serve as said switch in the closed switch position.

4. A device as set forth in claim 3, including a releasable latch means interconnecting the case and the traveler to normally retain the traveler in the case and being manually operable to release said interconnection and permit the traveler to be removed from the case.

5. A device as set forth in claim 4, wherein said strap is on the same side of the holder as are said holder connections and extends from one of said holder connections toward the other holder connections, said case connections including a pair of electrically conductive spring arms on the interior of the case in juxtaposition to said holder connections and biased to be urged toward said traveler.